(12) United States Patent
Kreiner

(10) Patent No.: US 7,257,466 B2
(45) Date of Patent: Aug. 14, 2007

(54) INTELLIGENT CONTROL DEVICES

(75) Inventor: Barrett Kreiner, Woodstock, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 105 days.

(21) Appl. No.: 11/002,924

(22) Filed: Dec. 2, 2004

(65) Prior Publication Data

US 2006/0120008 A1  Jun. 8, 2006

(51) Int. Cl.
| | |
|---|---|
| G05B 11/01 | (2006.01) |
| G05D 3/12 | (2006.01) |
| H01R 13/64 | (2006.01) |
| H01H 9/02 | (2006.01) |
| H01H 19/04 | (2006.01) |
| H02B 1/40 | (2006.01) |
| H02G 3/08 | (2006.01) |

(52) U.S. Cl. .......................... 700/292; 700/21; 700/22; 439/373; 439/535; 439/620.21; 439/620.22; 307/149; 174/53; 174/58; 174/480; 174/481

(58) Field of Classification Search ................ 700/272, 700/279, 21–22; 307/149; 439/373, 535, 439/620.21, 620.22; 174/53, 58, 480–481
See application file for complete search history.

(56) References Cited

U.S. PATENT DOCUMENTS

| | | | | |
|---|---|---|---|---|
| 4,604,708 A | | 8/1986 | Lewis | .................. 364/900 |
| 4,688,869 A | * | 8/1987 | Kelly | .................. 439/209 |
| 4,703,386 A | * | 10/1987 | Speet et al. | .................. 361/56 |
| 4,772,227 A | | 9/1988 | Pelzl | .................. 439/681 |
| 4,915,639 A | * | 4/1990 | Cohn et al. | .................. 439/188 |
| 5,297,015 A | * | 3/1994 | Miyazaki et al. | ........... 363/146 |
| 5,506,790 A | * | 4/1996 | Nguyen | .................. 700/286 |
| 5,519,376 A | | 5/1996 | Iijima | .................. 340/426 |
| 5,684,337 A | | 11/1997 | Wallace | .................. 307/10.2 |
| 5,703,413 A | | 12/1997 | Treharne | .................. 307/10.5 |
| 5,793,125 A | * | 8/1998 | Tarng | .................. 307/117 |
| 5,917,229 A | * | 6/1999 | Nathan et al. | .............. 257/529 |
| 6,058,034 A | * | 5/2000 | Cummings et al. | ........... 363/74 |
| 6,061,261 A | * | 5/2000 | Chen et al. | .................. 363/146 |
| 6,552,888 B2 | * | 4/2003 | Weinberger | .................. 361/57 |
| 7,136,270 B2 | * | 11/2006 | Liebenow | .................. 361/118 |
| 2001/0046815 A1 | * | 11/2001 | Luu | .................. 439/682 |
| 2004/0156159 A1 | * | 8/2004 | Liebenow | .................. 361/118 |
| 2005/0002142 A1 | * | 1/2005 | Chueh et al. | .............. 361/91.1 |

OTHER PUBLICATIONS

USPTO PLUS—Patent Linguistic Utility Service (2 pages).*
SMARTHOME "What is x10?".

* cited by examiner

Primary Examiner—Ronald D Hartman, Jr.
(74) Attorney, Agent, or Firm—Merchant & Gould

(57) ABSTRACT

A control device operates to selectively provision power. The control device can be implemented as part of an electrical apparatus, such as a computer, television, VCR, hairdryer or other device which operates on AC power. The control device can be also implemented as part of a common power outlet or breaker system typically found in businesses and households.

20 Claims, 5 Drawing Sheets

INTELLIGENT CONTROL DEVICES

FIELD OF THE INVENTION

The present invention generally relates to electrical devices. More particularly, the present invention relates to electrical control devices for controlling the provision of power.

BACKGROUND OF THE INVENTION

Many electrical systems utilize an electrical plug having two or three conductive prongs which couple to an electrical outlet. Likewise, an electrical outlet will include two or three ports or receptacles for receiving the conductive prongs of an electrical plug. Various businesses and residences utilize electrical systems having electrical plugs for providing power to the systems when coupled to electrical outlets. However, there are occasions where it would be preferred not to provide power to one or more electrical system when such systems are electrically connected to electrical outlets. For example, hotels are increasingly seeing electrical components, such as television sets, hairdryers, radios, etc. stolen from the facilities. Many hotels implement mechanical measures, such as locks and other hardware to physically prevent thieves from stealing these and other items. There are other businesses and households which implement similar physical measures to prevent thieves from stealing property. Additionally, typically electrical outlets and related plugs provide no disabling mechanism for preventing power supplied from or to the outlets or plugs. Dangerous situations can arise when a child or infant attempts to manipulate an electrical plug or an outlet. Simply installing a mechanical cap may not provide a sufficient deterrent to prevent harm to the child or infant.

Thus, there are many situations where it is desirable to limit the operability of an electrical system.

SUMMARY OF THE INVENTION

Embodiments of the present invention provide electrical control devices for preventing unauthorized and other use of an apparatus and/or power supply. The inventive control device operates to selectively provision power from a power outlet and/or to an apparatus or system. The control device can be implemented as part of an electrical apparatus, such as a computer, television, VCR, hairdryer, or other device which operates on AC power or other power sources. The control device can also be implemented as part of a common power outlet typically found in businesses and households. As described herein, the control device can be used as part of an electrical apparatus or system.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to control devices having certain characteristics for preventing operation of an apparatus or other system unless the control device is coupled to a device having compatible characteristics. Once devices having similar characteristics are coupled to one another, the devices operate after receiving confirmation of the similar characteristics. For example, the device may be used in many different types of electrical systems, such as televisions, VCRs, computers, hairdryers, lamps, etc. Embodiments of the invention may be used in conjunction with any electrical system, device, apparatus, etc. operable to plug into an electrical outlet. The devices can also be implemented as part of a power supply system, as described further below.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
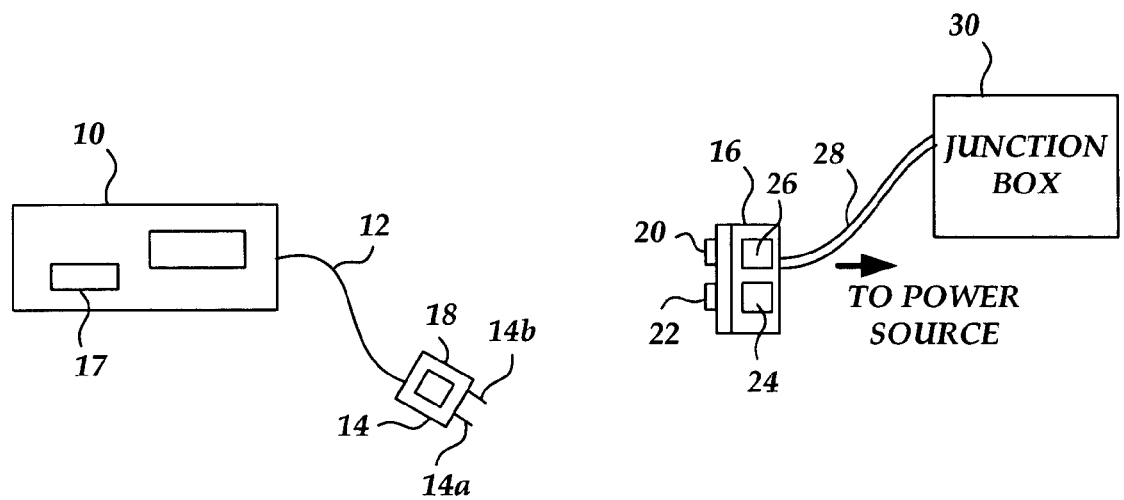
FIG. 1 illustrates an exemplary apparatus and power outlet, each including a control device according to an embodiment of the present invention.

Referring now to the drawings, in which like numerals represent like elements through the several figures, aspects of the present invention will be described. As shown in FIG. 1, an apparatus 10, such as the cable modem depicted, includes an electrical cord 12 having a plug 14 for electrically coupling to a power outlet 16, such as a typical alternating current (AC) power outlet found in many households and businesses.

Figure 4:
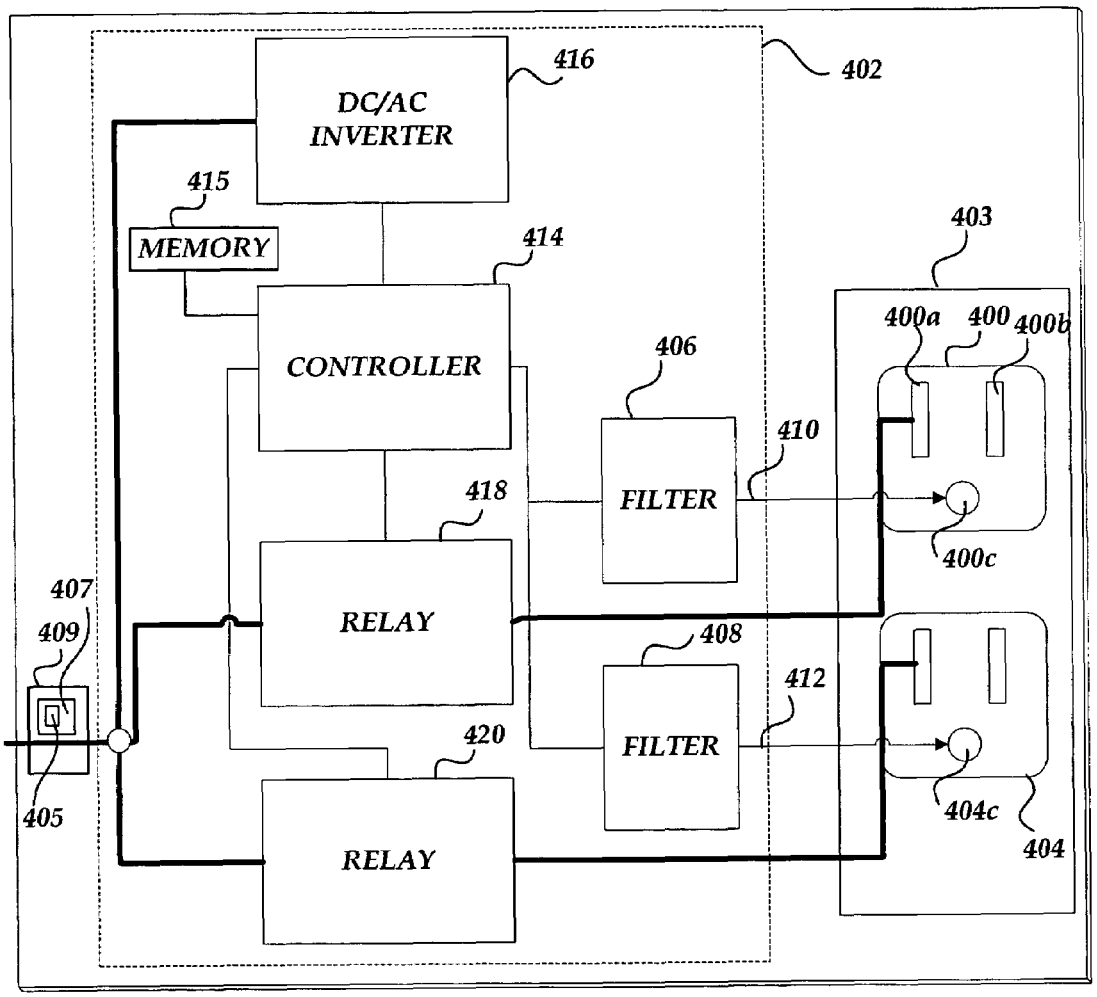
FIG. 4 is a block diagram illustrating control components of another control device according to an embodiment of the present invention; and, FIG. 5 is a flow diagram according to an embodiment of the present invention.

Normally, plugging the electrical cord 12 into power outlet 16 forms an electrical circuit between the apparatus 10 and the power outlet 16 which is coupled to a central power source, such as source 409 (see FIG. 4). In the typical arrangement, actuating a power switch 17 or similar actuator, completes the circuit, allowing electrical current to flow from the power outlet 16 to the apparatus 10. According to embodiments of the invention, electrical current and hence power, is provided to the apparatus 10 or other system, once certain conditions have been satisfied, as described below.

As shown in FIG. 1, and according to one embodiment of the invention, a control device 18 can be fabricated as part of plug 14 for controlling the provision of electrical current and hence power from the power outlet 16 to the apparatus 10. As described below, however, the control device 18 may be positioned at various locations between the power switch 17 and the plug 14, and the invention is not intended to be limited by any specific examples or embodiments described herein. According to the embodiment shown in FIG. 1, the control device 18 is in electrical communication with the apparatus 10.

Depending on the particular electrical configuration, the plug 14 typically includes at least two electrical prongs 14a and 14*b*. As is well known many plugs 14 include a third prong. For example, and as shown in FIG. 4, typically a 120-volt power outlet receptacle 400 includes two vertical slots 400*a* and 400*b*. The power outlet 403 includes the outlet receptacle 400 having a round hole 400*c*, centered below the vertical slots 400*a* and 400*b*. Generally, the left slot 400*a* is slightly larger than the right slot 400*b*. The left slot 400*a* may be termed a "neutral" or "ground" (depending on two or three prong configuration) electrical connection. The right slot 400*b* is typically termed a "hot" or "live" electrical connection. The hole 400*c* is typically termed "ground."

The prongs 14*a* and 14*b* couple with the slots 400*a* and 400*b* of the power outlet receptacle 400 by inserting the prongs 14*a* and 14*b* of the plug 14 into the slots 400*a* and 400*b* of the power outlet receptacle 400. For this example, prong 14*a* corresponds to "neutral" and prong 14*b* corresponds to "hot." The electrical cord 12 electrically couples the electrical components of the apparatus 10 to the electrical components of the power outlet 16, upon inserting the prongs 14*a* and 14*b* (14*c* for 3-prong configuration) of the plug 14 into the slots 400*a* and 400*b* of power outlet 16.

As described below, the control device 18 includes operability to selectively control the operation of the apparatus 10 once the plug 14 is in electrical communication with the power outlet 16. As shown in FIG. 1, a typical power outlet 16 includes at least two receptacles 20 and 22 which include the slots and hole described above. For certain embodiments, the power outlet 16 also includes one or more control devices 24 and/or 26, configured to selectively control the provision of power from the power outlet 16, once a plug, such as the plug 14, has been connected to the power outlet 16. The power outlet 16 includes an electrical conduit 28 which electrically connects the power outlet 16 to a central power source, such as power source 409. The power source 409 also typically includes an electrical junction or circuit breaker box 30.

Figure 2:
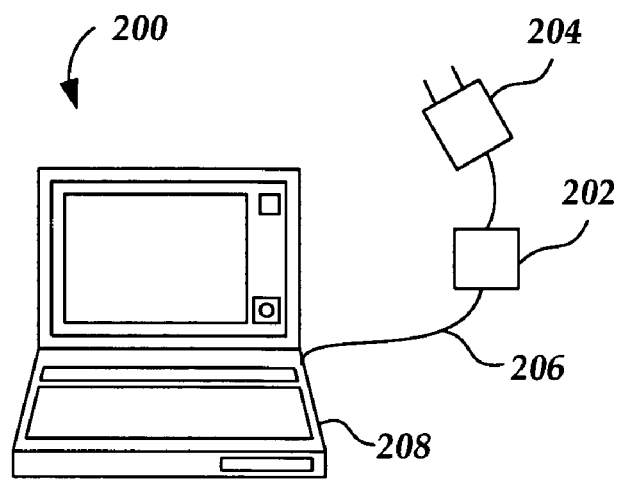
FIG. 2 illustrates another exemplary apparatus including a control device according to an embodiment of the present invention.

FIG. 2 depicts another electrical apparatus 200, a laptop computer, which also includes a control device 202 operable to selectively control the operation of the apparatus 200 once a plug 204 is electrically connected to a power outlet, such as power outlet 16. As shown in FIG. 2, the control device 202 is located along an electrical conduit 206 between the plug 204 and a main body 208 of the apparatus 200. It will be appreciated that the control device 202 may be located at other locations as well, as long as the control device 202 is positioned to control the provision of power to the apparatus 200. For example, thieves routinely steal hotel items, such as alarm clocks, hairdryers, televisions, etc. The control device 202 enables a user, such as a hotel owner, to prevent unauthorized provision of power to the apparatus 200.

Figure 3:
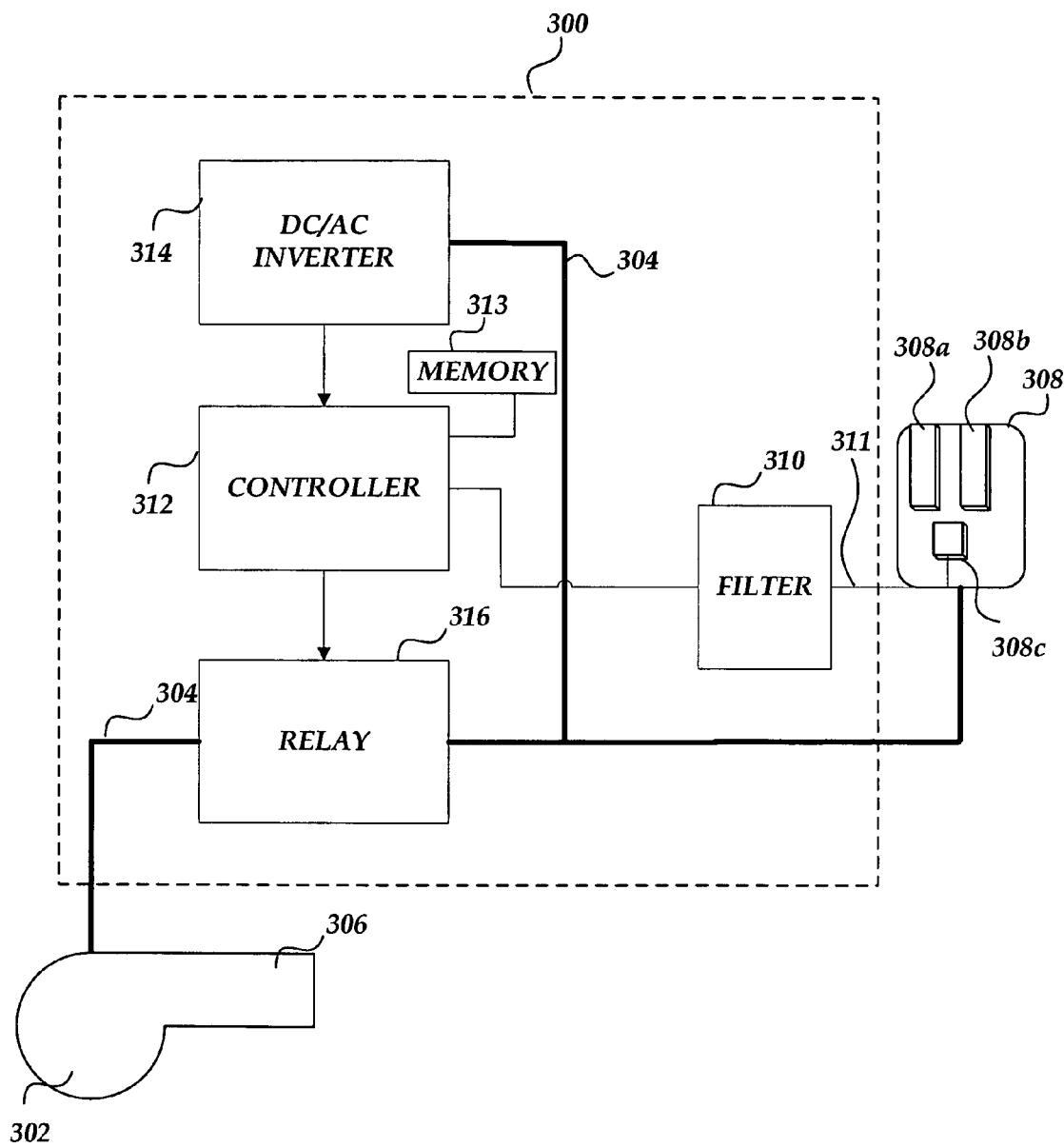
FIG. 3 is a block diagram illustrating control components of a control device according to an embodiment of the present invention.

Referring to FIG. 3, an embodiment of a control device 300 is shown. The control device 300 is in electrical communication with an electrical apparatus 302, such as the hairdryer depicted. According to this embodiment, the control device 300 is located along the electrical cord 304 (typically an AC conduit) of the apparatus 302, between a main housing 306 and an electrical plug 308. The plug 308 includes a first prong 308*a*, second prong 308*b*, and a third prong 308*c*. The first prong 308*a* corresponds to a "live" or "hot" electrical connection. The second prong 308*b* corresponds to a "neutral" electrical connection and the third prong 308*c* corresponds to a "ground" electrical connection. For this embodiment, the third prong 308 is in electrical communication with the control device 300. In alternative embodiments, the first prong 308*a* and/or second prong 308*b* can be in electrical communication with the control device 300, with or without the third prong 308*c* electrically communicating with the control device 300.

The control device 300 is preferably fabricated as an integrated circuit (IC) or programmable logic device (PLD) with additional electrical features. PLDs include non-volatile (e.g. EPROM, EEPROM, Flash EPROM, Flash EEPROM, or antifuse) or volatile (e.g. SRAM or DRAM) memory cell arrays which programmably create data paths and logic functions within the devices that are specific to a preferred design. The information stored in these arrays is typically termed configuration data. These arrays are generally erasable, thereby allowing the desired functionality of the PLD to be changed many times.

As shown in FIG. 3, according to this embodiment, the control device 300 includes a filter 310 in electrical communication with the third prong 308*c* of the plug 308 via line 311. The filter 310 tends to prevent low frequency AC power from traveling to a controller 312, such as a type 5800 controller. The filter 310 preferably comprises a bandpass or high pass filter. Most preferably, the control device 300 operates using communication frequencies which differ from the operating frequencies used by the apparatus 300 and/or power outlet 403 and thereby tend not to interfere with the operating frequencies typically used in homes and businesses. Based on the application, the device 300 can be fabricated to use any desirable communication frequencies and protocol.

That is, in preferred embodiments, the control device 300 communicates by sending and receiving signals having frequencies greater or less than 60 Hz for US households and businesses. The control device 300 communicates by sending and receiving communication signals described below. More particularly, the controller 312 operates to send and receive information, using information stored in memory 313, by way of communication signals to and from a power outlet, such as power outlet 403 shown in FIG. 4.

The control device 300 also includes an inverter 314 for converting AC power to DC levels. The inverter 314 provides DC power to the controller 312 once the control device 300 is coupled to the power outlet 403 by inserting the plug 308 into a power outlet 403. The controller 312 communicates with the power outlet 403 by sending communication signals down the electrical cord 304. Based on information received through communication signals transmitted from the power outlet 403, the controller 312 provides a control signal to a local relay 316. The control signal operates to close the relay 316, thereby completing an electrical circuit and allowing power to reach the apparatus 300. The relay 316 can comprise one or more solid-state transistors, an electrical switch, mechanical switch, or some combination thereof. The relay 316, upon command by the controller 316, operates to prevent electrical current from flowing to the apparatus 300, or allows electrical current to flow to the apparatus.

Referring now to FIG. 4, a control device 402 is shown for selectively controlling the power provided by the power source 409, which typically includes a number of circuit breakers 407. The control device 402 operates to provide power to an apparatus, such as apparatus 302, upon proper negotiation between the control device 300 of the apparatus 302 and control device 402 of the power outlet 403, as described below. It will be appreciated that separate control devices 402 may be used for each receptacle 400 or 404 of the power outlet 403. Control device 402 is preferably fabricated as an integrated circuit (IC) or programmable logic device (PLD) with additional electrical features.

As shown in FIG. 4, according to this embodiment, the control device 402 includes filters 406 and 408. Filter 406 is in electrical communication with round hole 400c (ground) of power outlet 403 via line 410. Filter 408 is in electrical communication with round hole 404c (ground) of the power outlet 403 via line 412. As described above, each filter 406 and 408 tends to prevent low frequency AC power from traveling to a controller 414. Each filter 406 and 408 preferably comprises a bandpass or high pass filter.

As described above for control device 300, the control device 402 most preferably operates using communication frequencies which differ from the operating frequencies used by the apparatus 302 and/or power outlet 403. The operating frequencies typically used in homes and businesses tend not to interfere with the control devices' 300 and 402 operating frequencies. That is, in preferred embodiments, the control device 402 communicates by sending and receiving signals having frequencies greater or less than the operating frequencies used in households and businesses. The control device 402 communicates by sending and receiving communication signals described below. More particularly, the controller 414 operates to send and receive information, using information stored in memory 415, by way of communication signals to and from a power outlet 403.

As shown in FIG. 4, the control device 402 includes an inverter 416 for converting AC power to DC levels. The inverter 416 provides DC power to the controller 414 once the control device 402 is coupled to the power outlet 403. The controller 414 communicates with an electrical apparatus 300 by sending communication signals across lines 410 and/or 412. Based on information received through communication signals transmitted from the apparatus 300, the controller 414 provides a control signal to a first or second local relay 418 and/or 420. One or more control signals operate to close the first and/or second relays 418 and/or 420 to thereby complete an electrical circuit, providing power to the apparatus 300 from the central power source 409. As described above, each relay 418 or 420 can comprise one or more transistors, mechanical switch, or some combination thereof. Each relay 418 or 420, upon command by the controller 414, operates to provide or prevent electrical current from flowing to the apparatus 300 from the power source 409.

Figure 5:
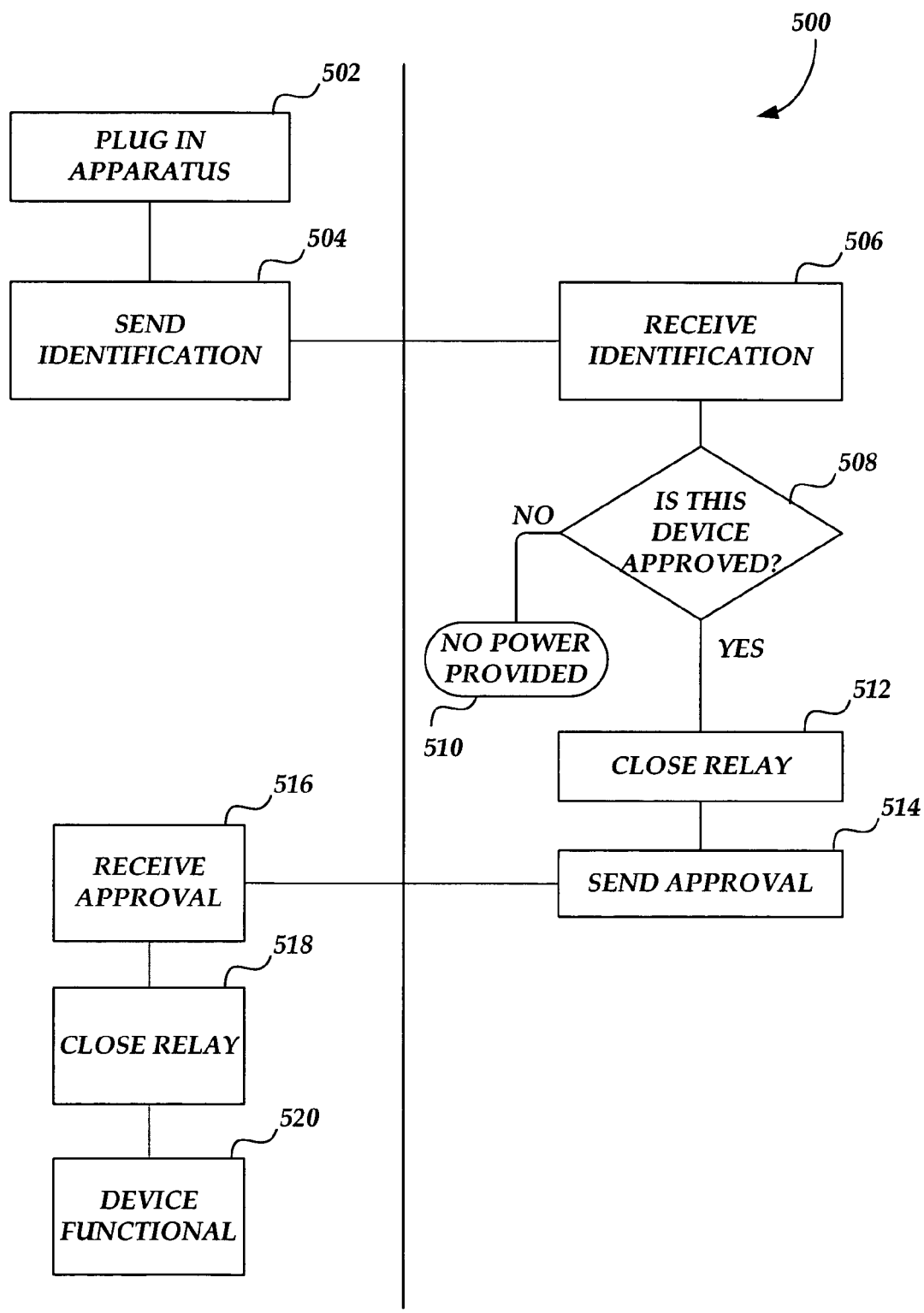

As shown in the flow diagram of FIG. 5, an operational sequence 500 is described utilizing the control devices, such as devices 300 and 402. At 502 the sequence begins when the plug 308 is first plugged into a receptacle 400 of the power outlet 403. As described below, the control devices 300 and 402 utilize a communication protocol to determine compatibility there between. If the control devices 300 and 402 are compatible, based on the communicated signals, an apparatus 302 is able to receive power from the power outlet 403. It will be appreciated that every power outlet provides current, however minimal (~7 volts), even when an apparatus is not turned on. This current, which may be termed leak current, allows the device 300 to operate without having an internal power source. However, in alternative embodiments, the device 300 can include an internal power device.

After plugging the plug 308 of the apparatus 302 into the power outlet 403, the controller 312, at 504, is prompted to send a communication signal across the cord 304 to the receptacle 400 of the power outlet 403. The prompt is preferably part of an initiation sequence of the controller 312. The communication signal may include information in the form of a carrier wave including encoded data or other protocol, which may include a serial number, class, and operational characteristics associated with the apparatus 302. For this embodiment, the memory 313 and 415 of each device 300 and 402 includes data associated with a class, identification (ID) number, and/or one or more rules. For example, device 300 may include ID number 5,000,000 and particular electrical characteristics. The rules functionality is preferably encoded in the controllers 312 and/or 414, providing coded information, such as device 302 may only work with a device having these characteristics, ID numbers, etc.

At 506, device 402 receives the communication signal over line 410. As described, above the filter 406 operates to filter out unwanted frequencies associated with the communication and other signals. The controller 414 of device 402 accesses the memory 415 and uses the data associated with a class, identification (ID) number, and/or one or more rules, at 508, to determine whether device 300 is an approved device. If it is determined that the device 300 is not an approved device, at 510, the controller 414 prevents the relay 418 from closing, thereby preventing the flow of current from the power outlet 403 to the apparatus 302. At 512, if it is determined that the device 300 is an approved device, the controller 414 closes the relay 418 allowing electrical current to flow from the power outlet 403 to the apparatus 302.

After closing the relay 418, at 514, the controller 414 of device 402 sends its own communication signal across line 311. For example as described above, the device 300 may communicate that it is device 5,000,000 having these electrical characteristics and further operates in conjunction with outlets having devices 5,000,212, 5,000,211, and 5,000,210. Once controller 414 recognizes that device 300 is a proper device, the controller 414 sends its communication signal affirming that it knows device 300 is a proper device and asking the device 300 to close its relay 316 so that power may be delivered to the apparatus 302. At 516, upon receiving the approval communication signal from the device 402, the controller 312, at 518 closes the relay 316. Once the relays 418 and 316 are closed, at 520, the apparatus 302 can be switched on to receive operational power from the power outlet 403. If the device 402 is not compatible with device 300, no authorization signal will be transmitted, and the relay 316 will remain open.

According to this embodiment of the invention, communicating and confirming the compatibility of devices 300 and 402 before provisioning power from the power outlet 403 provides an additional level of safety over existing electrical appliances and other systems. For example, current residential electrical circuits are typically 15 amp circuits. With a typical power outlet there is no mechanism for preventing a user from plugging in an industrial machine or large power drawing system. With the embodiment of the present invention, if the device 300 is not compatible with the device 402, the negotiation based on the communicated signals will be unsuccessful and no power will be supplied from the power outlet 403 to the apparatus 302.

In alternative embodiments, device 300 sends a communication signal to device 402, alerting device 402 that the apparatus 302 includes certain specifications, including its power rating and minimum/maximum power requirements. The device 300 will only open relay 316 is if the device 402 sends a communication signal which alerts device 300 that the power outlet 403 can handle the power requirements of the apparatus 302. Similarly, the device 402 is operable to send a communication signal to the device 300, alerting the device 300 that power outlet 403 is capable of producing a certain amount of power and will not provide power to devices which are not specification compatible. Thus, devices 300 and 402 communicate by sending the various communication signals described above and, based on the interactive communication, can determine the respective compatibilities of an apparatus 302 and power outlet 403 or circuit breaker 407, before creating a dangerous or hazardous electrical situation.

According to another embodiment of the invention, a device 405, similar to the devices 300 and 402 can be implemented as part of a circuit breaker circuit 407, located in the electrical circuit configuration or as part of one or more circuit breakers. The device 402 of a power outlet 403 can send communication signals to device 405 located at the circuit breaker circuit 407. The communication signals may include information related to the amount of power currently being provisioned to each apparatus and system electrically connected to the central power source 409. The device 405 at the circuit breaker circuit 407 may send a communication signal to a power outlet 403 instructing the outlet 403 to not open its relay 418 or 420, because providing any more power would trip a breaker. The device 405 may include a further operability to calculate an amount of load being put on the circuit based on what devices 402 are announcing.

For certain devices 18, 202, 300, and 402, it is preferred to include a tamper-resistant mechanism which tends to prevent unauthorized manipulation of the identification and other codes contained therein. For example, the device housing may include a tamper seal that, when broken or tampered with, severs a trace line of the integrated circuit/controller 312, 414. The tamper-resist mechanism would also prevent unauthorized re-wiring, re-cording, and other undesirable operations. The devices described herein are useful in security, home safety, and other implementations. The devices 300 and 402 prevent the operation of an apparatus 302 unless there is a proper negotiation between the devices 300 and 402.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A controller for use with an electrical receptacle capable of selectively delivering power to an electrical apparatus, the controller for providing a control signal, wherein the control signal is not equal to an operating frequency of the electrical apparatus, the controller being configured to utilize a leak current to provide power to the controller when the electrical apparatus is not turned on, the controller comprising:
   an input for receiving a first signal through an outlet from the electrical apparatus and for transmitting a second signal,
   a filter configured to be in electrical communication with a prong of a plug, the filter being configured to filter the first signal received from the electrical apparatus, and
   a control output for outputting the control signal upon receipt of the first signal from the filter; and
   a relay in electrical communication with the control output of the controller, the relay for selectively providing power to the outlet from a power source upon receipt of the control signal from the controller.

2. The controller of claim 1 wherein the controller further comprises operability to send a close control signal to the relay operating to close the relay and thereby enabling the electrical receptacle to receive power from the power source.

3. The controller of claim 2 wherein the controller operates to send the close control signal when the input/output of the controller receives a handshake signal including a proper class and/or identification code.

4. The controller of claim 1 wherein the controller further comprises operability to send an open control signal to the relay operating to open the relay and thereby preventing the electrical receptacle from receiving power from the power source.

5. The controller of claim 4 wherein the controller operates to send the open control signal when the input/output of the controller receives a signal that does not include a proper class and/or identification code.

6. The controller of claim 1 wherein the controller and relay further comprise a programmable logic device (PLD) including coded instructions comprising a class and/or an identification code.

7. The controller of claim 1, wherein the filter is a high pass filter.

8. The controller of claim 1, wherein the filter is a bandpass filter.

9. The controller of claim 1 further comprising an inverter for converting AC power to DC power.

10. The controller of claim 1 further comprising a tamper resistant mechanism configured to prevent unauthorized manipulation of the electrical receptacle, the tamper resistant mechanism configured such that when tampered with severs a trace line of the controller.

11. A controller for use with an electrical receptacle capable of selectively delivering power to an electrical apparatus,
   the controller for providing a control signal, the controller comprising:
      an input terminal for receiving an input signal through an outlet from the electrical apparatus and for transmitting an output signal, wherein the input signal is greater than or less than an operating frequency of the electrical apparatus,
      a filter in electrical communication with a prong of a plug, configured to filter the input signal received from the electrical apparatus, and
      a control output for outputting the output signal upon receipt of the input signal from the filter;
   an internal power supply configured to provide power to the electrical receptacle when the electrical apparatus is not in use; and
   a relay in electrical communication with the control output of the controller, the relay for selectively providing power to the outlet from a power source upon receipt of the output signal from the controller.

12. The controller of claim 11 wherein the controller is configured to send a close control signal to the relay operating to close the relay and enable the electrical receptacle to receive power from the power source.

13. The controller of claim 12 wherein the controller operates to send the close control signal when the input of the controller receives a handshake signal including at least one of a proper class and identification code.

14. The controller of claim 11 wherein the controller further comprises operability to send an open control signal to the relay operating to open the relay and prevent the electrical receptacle from receiving power from the power source.

15. The controller of claim 14 wherein the controller operates to send the open control signal when the input of the controller receives a signal that does not include at least one of a proper class and identification code.

16. The controller of claim 11 wherein the controller and relay further comprise a programmable logic device (PLD) including coded instructions comprising a class and/or an identification code.

17. The controller of claim 11 further comprising an inverter for converting AC power to DC power.

18. The controller of claim 11, wherein the filter is a high pass filter.

19. The controller of claim 11, wherein the filter is a bandpass pass filter.

20. An electrical receptacle capable of selectively delivering power to an electrical apparatus comprising:

an outlet configured for delivering power from a power source to the electrical apparatus;

a controller configured to utilize a leak current to provide power to the controller when the electrical apparatus is not turned on for providing a control signal, the controller comprising:

an input terminal for receiving a first signal through the outlet from the electrical apparatus and for transmitting a second signal, wherein the first signal is greater than or less than an operating frequency of the electrical apparatus, a tamper resistant mechanism configured to prevent at least one of the following: unauthorized manipulation of the controller and re-cording of an identification code stored in a controller memory;

a first and second filter in electrical communication with a prong of a plug, configured to filter the first signal received from the electrical apparatus, and a control output for outputting the second signal upon receipt of the fist signal from the first and second filters; and a relay in electrical communication with the control output of the controller, the relay for selectively providing power to the outlet from the power source upon receipt of the second signal from the controller.

\* \* \* \* \*